(12) United States Patent
Petrowicz et al.

(10) Patent No.: US 8,539,748 B2
(45) Date of Patent: Sep. 24, 2013

(54) SEGMENTED INERTIAL PARTICLE SEPARATORS AND METHODS OF ASSEMBLING TURBINE ENGINES

(75) Inventors: John Paul Petrowicz, Rowley, MA (US); Timothy Joseph Higgins, Topsfield, MA (US); Walter Jackson Tingle, Danvers, MA (US)

(73) Assignee: General Electric Company, Schenectady, NY (US)

(*) Notice: Subject to any disclaimer, the term of this patent is extended or adjusted under 35 U.S.C. 154(b) by 1238 days.

(21) Appl. No.: 11/611,652

(22) Filed: Dec. 15, 2006

(65) Prior Publication Data

US 2008/0141649 A1 Jun. 19, 2008

(51) Int. Cl.
  *F02G 3/00* (2006.01)
(52) U.S. Cl.
  USPC ............ 60/39.092; 244/53 B; 137/15.1; 181/213; 181/214; 181/220; 55/306; 415/121.2
(58) Field of Classification Search
  USPC ............ 60/39.092; 137/15.1; 244/53 B; 55/306; 415/121.2; 181/213, 214, 220
  See application file for complete search history.

(56) References Cited

U.S. PATENT DOCUMENTS

| | | | |
|---|---|---|---|
| 3,449,891 A * | 6/1969 | Amelio et al. | 55/306 |
| 3,978,656 A | 9/1976 | Murphy | |
| 3,998,048 A * | 12/1976 | Derue | 60/39.092 |
| 4,425,756 A * | 1/1984 | Ballard et al. | 60/39.092 |
| 4,509,962 A | 4/1985 | Breitman et al. | |
| 4,527,387 A | 7/1985 | Lastrina et al. | |
| 4,685,942 A | 8/1987 | Klassen et al. | |
| 4,702,071 A | 10/1987 | Jenkins et al. | |
| 4,704,145 A | 11/1987 | Norris et al. | |
| 4,860,534 A | 8/1989 | Easley et al. | |
| 4,928,480 A * | 5/1990 | Oliver et al. | 60/39.092 |
| 6,499,285 B1 * | 12/2002 | Snyder | 60/39.092 |
| 6,508,052 B1 | 1/2003 | Snyder et al. | |
| 6,698,180 B2 | 3/2004 | Snyder | |
| 6,969,237 B2 | 11/2005 | Hudson | |

OTHER PUBLICATIONS http://www.globalspec.com/learnmore/manufacturing_process_equipment/air_quality/cyclone_separators.*

* cited by examiner

*Primary Examiner* — Phutthiwat Wongwian
*Assistant Examiner* — Craig Kim
(74) *Attorney, Agent, or Firm* — General Electric Company; William Scott Andes; Matthew P. Hayden

(57) ABSTRACT

A method for assembling a turbine engine including a compressor is disclosed. The method includes coupling an inlet including an inertial particle separator (IPS) and a first surface that is defined using a segment angle, to a gas turbine engine, and coupling the first surface substantially flush against a fuselage of an aircraft to reduce drag.

17 Claims, 3 Drawing Sheets

US 8,539,748 B2

SEGMENTED INERTIAL PARTICLE SEPARATORS AND METHODS OF ASSEMBLING TURBINE ENGINES

BACKGROUND OF THE INVENTION

This invention relates generally to turbine engines, and more particularly, to segmented inertial particle separators used with turbine engines.

Sand and dust ingestion in gas turbine engines may adversely affect engine performance and reliability, and may also increase the frequency of repair and maintenance required for engines. Because flight readiness depends at least partially on reliably and properly functioning engines, reducing the occurrence of, and/or the effects of, sand and dust ingestion should facilitate enhancing the reliability of the engines.

Various methods are employed to facilitate reducing sand and dust concentrations channeled via the inlet airflow to the engine compressor. For example, known inertial particle separator (IPS) systems are either separate, or integrated into the engine, but may not provide adequate separation efficiency during severe sand and dust conditions. Moreover, known IPS systems with improved separation efficiency generally require more length and diameter than is available in contemporary helicopters. Inertial inlet particle separators work by imparting momentum and trajectory on sand and dust particles to channel such particles away from the fluid stream entering the gas turbine engine. The particles removed are then collected or scavenged in an overboard dump. However, the same features that cause the separation of sand and dust particles from the inlet air, also cause inlet pressure losses that may detrimentally effect gas turbine engine performance. Because of the permanent nature of known IPS systems, such engine performance losses are incurred in clean air and sandy air conditions.

During engine operation, fluid flow into a gas turbine engine inlet is channeled downstream towards an entry channel. The fluid is channeled past a convex section and is divided into two fluid streams. One of the streams, known as a dirty fluid flow, is channeled towards a dirty fluid channel. Debris, such as birds, and particles of debris, such as sand and dust, or snow and/or ice particles, flows through the dirty fluid channel into the IPS scavenge system wherein the debris is ejected from the gas turbine engine. The second fluid stream, known as a clean fluid flow, is channeled into a clean fluid channel. To facilitate "clean" flow into the clean fluid channel, the clean fluid flow is forced to make a sharp turn around a convex section. Most debris will not be capable of changing direction at the turn, due to the greater inertia and momentum of the debris particles. Consequently, most debris will be channeled into the dirty fluid channel, thus facilitating a flow of clean fluid into the gas turbine engine. IPS systems of this type facilitate removal of large sand particles and debris, but generally such IPS systems are not as effective in removing smaller particles or debris.

Some known helicopters are fitted with bulky barrier filters to address severe sand conditions. Although such filters satisfactorily remove sand and dust from the air, known filters are heavy, may detrimentally effect engine performance, require increased maintenance, and are unable to operate in icing conditions. Moreover, known filters also cause a pressure drop at the inlet of the gas turbine engine that also adversely affects engine performance. Furthermore, known filters may also be susceptible to plugging with sand and dust.

BRIEF DESCRIPTION OF THE INVENTION

In one aspect, a method for assembling a turbine engine including a compressor is disclosed. The method includes coupling an inlet including an inertial particle separator (IPS) and a first surface that is defined using a segment angle, to a gas turbine engine, and coupling the first surface substantially flush against a fuselage of an aircraft to reduce drag.

In another aspect, a gas turbine engine is provided. The gas turbine engine includes a compressor and an inlet coupled upstream from the compressor. The gas turbine engine also includes an inertial particle separator including a scroll vane, a scroll case, a blower scavenge duct, a scavenge blower and a scavenge blower exhaust duct. The inlet mates substantially flush against an exterior fuselage contour.

In yet another aspect, a segmented inertial particle separator is provided. The particle separator includes an inlet including an entry channel, a dirty fluid channel, a clean fluid channel, and an exterior inlet contour. The exterior inlet contour is configured to fit substantially flush against an aircraft exterior contour, the entry channel, The dirty fluid channel and the clean fluid channel extend radially about a center of the inlet through a segment angle that is less than 360°.

DETAILED DESCRIPTION OF THE INVENTION

Figure 1:
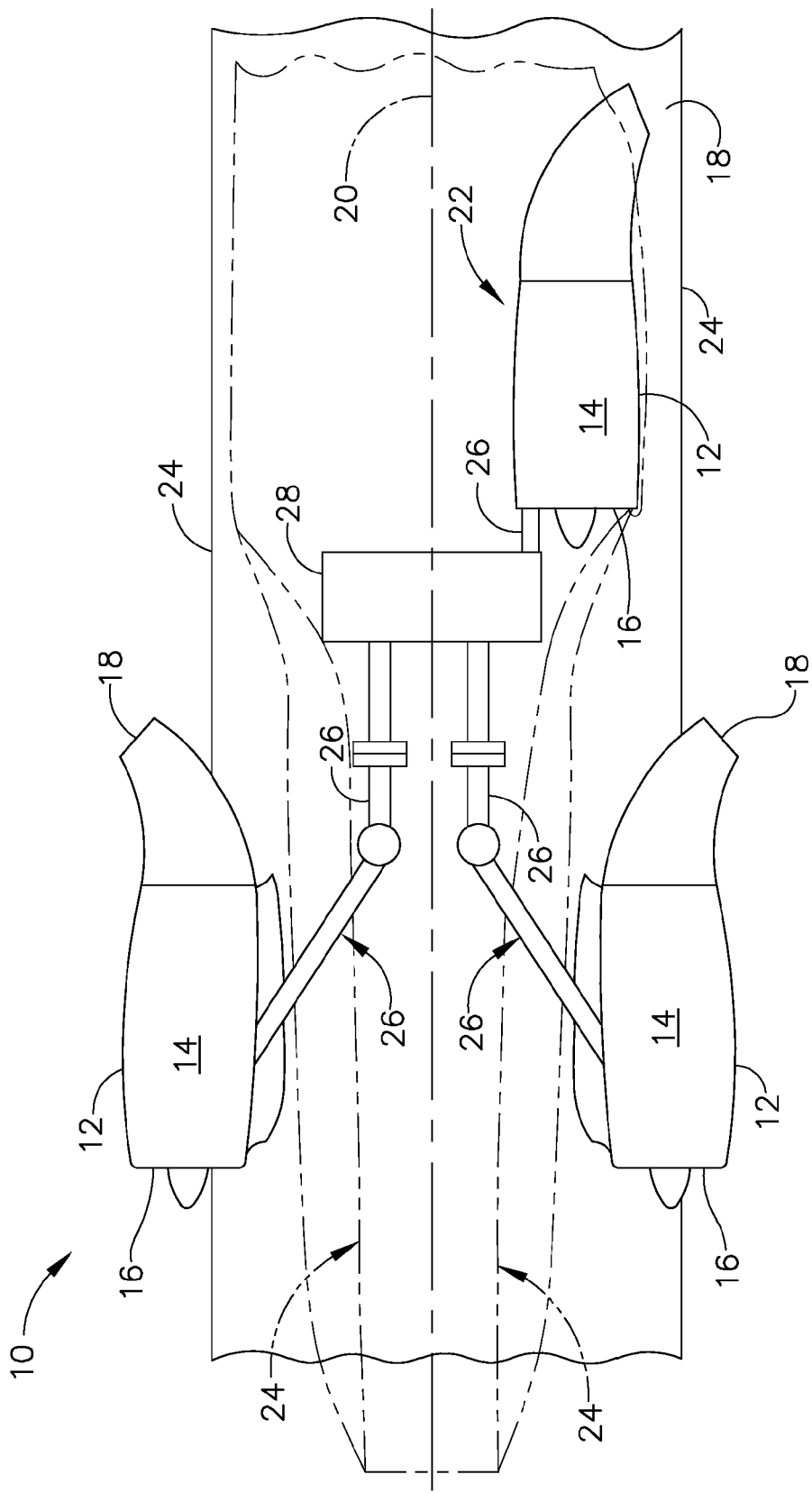
FIG. 1 is a plan view of a portion of a helicopter.

FIG. 1 is a plan view of helicopter 10 including gas turbine assemblies 12. In the exemplary embodiment, each gas turbine engine assembly 12 includes a gas turbine engine 14 which includes an inlet 16 and an exhaust 18. A pair of gas turbine engines 14 are oriented symmetrically with respect to an axis of symmetry 20 extending axially between the gas turbine engines 14. A third gas turbine engine 14 is oriented behind the pair of engines 14. More specifically, the pair of symmetrically oriented gas turbine engines 14 are mounted against a helicopter fuselage 24, while the third engine 14 is mounted within an engine compartment 22 defined by fuselage 24. A drive shaft 26 extends from the front of each gas turbine engine 14 to a main transmission 28. In other designs, the drive shaft 26 may extend from other regions of engines 14.

Figure 2:
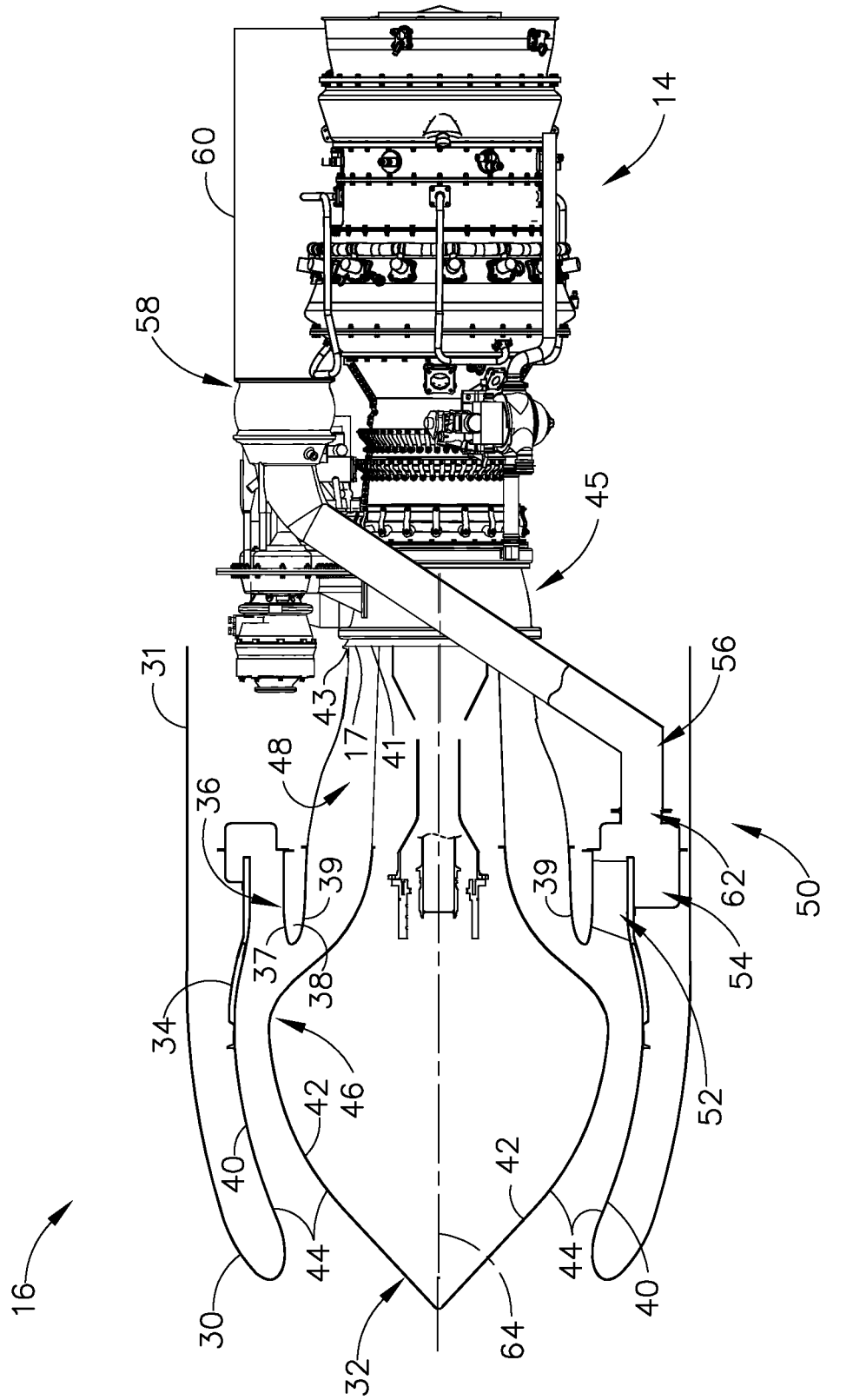
FIG. 2 is an enlarged cross-sectional view of a portion of an exemplary gas turbine engine inlet that may be used with the engine assemblies shown in FIG. 1.

FIG. 2 is an enlarged cross-sectional view of a portion of gas turbine engine inlet 16. In the exemplary embodiment, inlet 16 is removably coupled to engine 14, has an axial design, and functions as a segmented inertial particle separator (SIPS). More specifically, in the exemplary embodiment, inlet 16 includes a nacelle inlet 30, a conical and elliptically-shaped bullet nose 32, an outer segmented SIPS duct 34, a bypass duct or dirty-fluid channel 36, and a splitter 38. It should be understood that nacelle inlet 30 defines an outer surface 40 and bullet nose 32 defines an inner surface 42, and together, outer surface 40 and inner surface 42 define an entry channel 44. It should be understood that inlet 16 is designed to recover ram air total pressure into engine inlet static pressure for enhanced performance.

Inner surface 42 includes a convex section 46. Splitter 38 bifurcates entry channel 44 into a clean-fluid channel 48 and a dirty-fluid channel 36. Clean fluid channel 48 is defined between a first surface 39 of splitter 38 and inner surface 42. Clean fluid channel 48 extends from convex section 46 to an annular engine front frame air inlet 17 at a compressor 45 coupled within gas turbine engine 14. It should be understood that an end 41 of inner surface 42 and an end 43 of first surface 39 are removably coupled to annular engine inlet 17 at compressor 45. Dirty fluid channel 36 is defined between a second surface 37 of splitter 38 and outer surface 40, and extends from adjacent convex section 46 to a SIPS scavenge system 50. In the exemplary embodiment, SIPS scavenge system 50 includes a scroll vane 52 coupled to a first end of scroll case 54. A blower scavenge duct 56 is coupled to and extends from a scroll case exit port 62 of scroll case 54 to a scavenge blower 58, and a scavenge blower exhaust duct 60 is coupled to and extends away from scavenge blower 58. Scroll vane 52 and scroll case 54 extend radially about centerline 64 and about a circumference defined by entry channel 44.

It should be appreciated that in the exemplary embodiment, inlet 16 is removably coupled to gas turbine engine 14 at annular engine air inlet 17 and along an outer surface 31 of nacelle 30, using any type of fastening means (not shown). Fastening means include, but are not limited to, mechanical fasteners, such as bolts. Further, it should be appreciated that inlet 16 may be retrofitted to many different types of engines. Inlet 16 is removably coupled to gas turbine engine 14 to facilitate easier engine maintenance. It should also be appreciated that the term "fluid" as used herein includes any material or medium that flows, including but not limited to, gas, air and liquids.

During operation, dirty fluid flows through dirty fluid channel 36 to scroll vane 52. Scroll vane 52 channels the dirty fluid into scroll case 54. Scroll case 54 collects particles from the dirty fluid flow and guides the particles to a scroll case exit port 62. After passing through scroll case exit port 62, the particles flow through blower scavenger duct 56 towards scavenge blower 58, which discharges the particles out of scavenge blower exhaust duct 60 into the atmosphere. It should be appreciated that in the exemplary embodiment, blower 58 is an accessory gear box (AGB) powered blower that facilitates removing particles from dirty fluid scavenger duct 56 through scavenge blower exhaust duct 60. In alternate embodiments, blower 58 may be any device that facilitates discharging collected particles from dirty fluid scavenger duct 56 through scavenge blower exhaust duct 60. It should be appreciated that in other embodiments, blower 58 may be powered by any other means.

Figure 3:
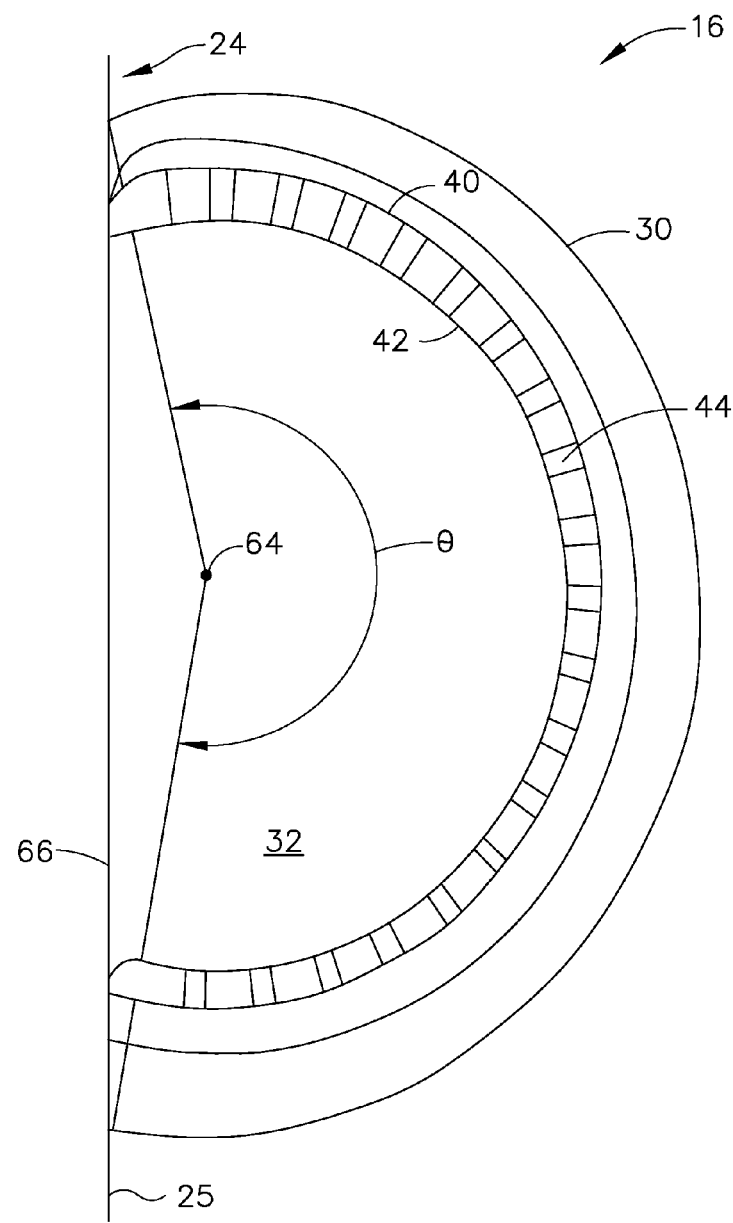
FIG. 3 is an enlarged front view of a gas turbine engine inlet that may be used with the engine assembly shown in FIG. 2.

FIG. 3 is an enlarged front view of gas turbine engine inlet 16 mounted on helicopter fuselage 24. More specifically, inlet 16 in the exemplary embodiment, includes a segmented sector configuration that defines a length of a surface 66. It should be appreciated that surface 66 may have any contour, such as, but not limited to, a linear, a curved and a curve-linear contour, that enables inlet 16 to function as described herein.

In the exemplary embodiment, the sector configuration is defined by a segment angle, or central angle θ that enables surface 66 to mate substantially flush against the exterior aerodynamic contour of fuselage 24. In the exemplary embodiment, angle θ is equal to approximately of 220°. Alternately, angle θ, in other embodiments, may be any angle that enables inlet 16 to function as described herein. Moreover, segment angle θ may be of any size that enables inlet 16 to provide adequate volumes of air to engine 14. Thus, the segmented size of inlet 16 is selected to ensure that segmented angle θ be sized to enable surface 66 to mate substantially flush against the exterior contoured surface 25 of fuselage 24, and to facilitate providing the volume of air required by engine 14 for combustion. Consequently, nacelle inlet 30, bullet nose 32, entry channel 44 and other associated inertial particle separator features of inlet 16 do not extend annularly about centerline 64, but rather, nacelle inlet 30, bullet nose 32, entry channel 44 and other inertial separator features extend arcuately centerline 64 for an arcuate segment defined by a segmented angle θ that is less than 360°.

The exemplary embodiments described herein use the available space around the nose gearbox of a gas turbine engine 14 to cause fluid entering the inlet to turn abruptly through a two dimensional inertial particle separator before transitioning into the gas turbine engine 14. For example, if applied to a CH-53 aircraft, inlet 16 could replace the aircraft inlet duct and engine air particle separator (EAPS) system with an inertial particle separator that is substantially more compact and lighter than known inertial particle systems. Also disclosed herein, is a method for sizing an inlet surface 66 to ensure that surface 66 mates substantially flush against an aerodynamic exterior contoured surface 25 of fuselage 24. By varying a segmented angle θ, inlet surface 66 may be designed to fit flush against the aerodynamic exterior contour of fuselage 24 of a plurality of different helicopters 10. Doing so, effectively enables the SIPS systems to be integrated with the nacelle 30 and fuselage 24, yielding a streamlined and efficient propulsion installation that can function during any weather conditions.

In each embodiment, the above-described segmented inertial particle separator (SIPS) facilitates sand and dust removal from the clean fluid entering the engine. More specifically, in each embodiment, the SIPS has a simple design so it is retrofittable with many different aircraft, and includes a annulus arc sector design defining a surface that fits flush against an exterior contour of a helicopter fuselage. As a result, during engine operation fewer sand and dust particles enter the engine and there is less drag. Accordingly, engine performance and component useful life are each facilitated to be enhanced in a cost-effective and reliable manner.

Exemplary embodiments of inertial particle separators are described above in detail. The annulus arc sector design is not limited to use with the specific inertial particle separator embodiments described herein, but rather, the segmented design can be utilized independently and separately from other inertial particle separator components described herein. Moreover, the invention is not limited to the embodiments of SIPS described above in detail. Rather, other variations of SIPS embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a turbine engine including a compressor, said method comprising:
coupling an inlet to a gas turbine engine, the inlet extending circumferentially about a centerline of the inlet over a predetermined segment angle that is less than 360° and the inlet including:
a bullet nose,
a nacelle spaced radially outwardly from the bullet nose such that an entry passage is defined between the bullet nose and the nacelle,
an inertial particle separator (IPS) positioned within the entry passage and oriented downstream of the bullet nose to define a dirty fluid channel and a clean fluid channel, wherein the dirty fluid channel is positioned downstream from a convex section of the bullet nose and is configured to receive particles separated from the fluid by inertia caused by the fluid flowing past the convex section of the bullet nose, and
a first surface that is defined by the segment angle, the segment angle selected such that the first surface matingly engages a surface of a fuselage of an aircraft when the inlet is installed on the aircraft; and
coupling the first surface flush against the fuselage of the aircraft to reduce drag.

2. A method in accordance with claim 1 wherein coupling an inlet further comprises selecting an inlet that has a segment angle that establishes a desired length of the first surface and that recovers ram air total pressure into engine inlet static pressure for enhanced performance.

3. A method in accordance with claim 1 wherein coupling an inlet further comprises coupling an inlet including a first surface that has at least one of a linear, curved and curve-linear contour.

4. A method in accordance with claim 1 wherein coupling an inlet further comprises coupling an inlet including a first surface that has a contour that substantially conforms to an exterior contour of the fuselage.

5. A method in accordance with claim 1 wherein coupling an inlet further comprises removably coupling the inlet to the gas turbine engine using a plurality of fasteners.

6. A method in accordance with claim 1 wherein coupling an inlet further comprises coupling the inlet such that said entry channel extends radially about a center of the inlet through the segment angle.

7. A gas turbine engine comprising:
a compressor; and
an inlet coupled upstream from said compressor, said inlet extending circumferentially about a centerline of the inlet over a predetermined segment angle that is less than 360° and that mates flush against an exterior fuselage contour and comprises a bullet nose, a nacelle spaced outwardly from the bullet nose such that an entry passage is defined between the bullet nose and the nacelle, and an inertial particle separator positioned within the entry passage and oriented downstream of said bullet nose, said inertial particle separator comprising:
a clean fluid channel for channeling a fluid from the entry passage to said compressor;
a dirty fluid channel for discharging particles suspended in the fluid from the entry passage to atmosphere, said dirty fluid channel positioned downstream from a convex section of the bullet nose, said dirty fluid channel configured to receive particles separated from the fluid by inertia caused by the fluid flowing past the convex section of the bullet nose; and
a scavenge system coupled to said dirty fluid channel, said scavenge system comprising a scroll vane, a scroll case, a blower scavenge duct, a scavenge blower and a scavenge blower exhaust duct.

8. A gas turbine engine in accordance with claim 7 wherein said inlet further comprises a first surface having a length defined by a segment angle.

9. A gas turbine engine in accordance with claim 8 wherein said first surface comprises at least one of a linear, curved and curve-linear shape.

10. A gas turbine engine in accordance with claim 7 wherein said inlet is removably coupled to said gas turbine engine.

11. A segmented inertial particle separator for a turbine engine, said particle separator comprising:
an inlet comprising an entry channel extending between a bullet nose and a nacelle, a splitter positioned within said entry channel and oriented downstream of said bullet nose to define a dirty fluid channel and a clean fluid channel, and an exterior inlet contour, each of said dirty fluid channel and said clean fluid channel in flow communication with said entry channel, said inlet extending circumferentially around a centerline of the inlet through an angle less than 360° wherein said exterior inlet contour is configured to fit flush against an aircraft exterior contour, said dirty fluid channel positioned downstream from a convex section of said bullet nose, said dirty fluid channel configured to receive particles separated from the fluid by inertia caused by the fluid flowing past the convex section of said bullet nose.

12. A segmented inertial particle separator in accordance with claim 11 wherein said inlet further comprises a scavenge system coupled in flow communication with said dirty fluid channel, said scavenge system comprising a scavenge blower.

13. A segmented inertial particle separator in accordance with claim 12 wherein said scavenge blower is an accessory gear box powered scavenge blower.

14. A segmented inertial particle separator in accordance with claim 11 wherein said inlet is removably coupled to a gas turbine engine using a plurality of mechanical fasteners.

15. A segmented inertial particle separator in accordance with claim 11 wherein said clean fluid channel is removably coupled to an annular inlet of said turbine engine.

16. A segmented inertial particle separator in accordance with claim 11 wherein said inlet comprises an exterior contour comprising at least one of a linear, a curved and a curve-linear shape.

17. A segmented inertial particle separator in accordance with claim 16 wherein a length of said exterior contour is defined by a segment angle.

* * * * *